Nov. 11, 1924.                                            1,514,660
                    F. J. DESSERY ET AL
              ANTISKID CHAIN SECURING DEVICE
                   Filed Oct. 13, 1923

Inventors
F. J. Dessery
and W. Niebaum,
By C. A. Snow & Co.
Attorneys

Patented Nov. 11, 1924.

1,514,660

UNITED STATES PATENT OFFICE.

FRANCIS J. DESSERY AND WILLIAM NIEBAUM, OF TONGANOXIE, KANSAS.

ANTISKID-CHAIN-SECURING DEVICE.

Application filed October 13, 1923. Serial No. 668,368.

*To all whom it may concern:*

Be it known that we, FRANCIS J. DESSERY and WILLIAM NIEBAUM, citizens of the United States, residing at Tonganoxie, in the county of Leavenworth and State of Kansas, have invented a new and useful Antiskid-Chain-Securing Device, of which the following is a specification.

This invention has reference to anti-skid chain securing devices employed in connection with motor vehicle wheels, it being the primary object of the invention to provide novel means to facilitate the application and removal of the chain.

A still further object is to provide means to remove the slack in an anti-skid chain automatically, and at the same time allow movement of the various chain sections with respect to each other while in use.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1:
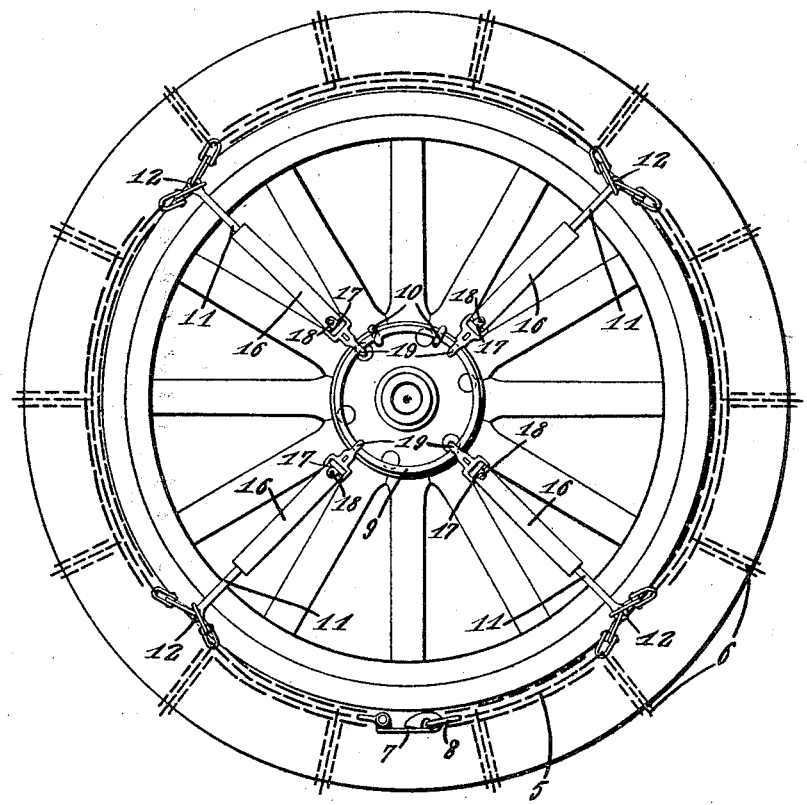
Figure 1 is a side elevational view disclosing an anti-skid chain securing device constructed in accordance with the invention.
Figure 2:
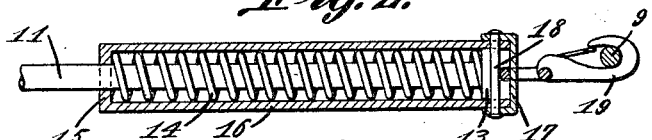
Figure 2 is a longitudinal sectional view through one of the tubular securing members.

Referring to the drawing in detail, the chain to which the securing device is secured includes a pair of supporting sections 5 and transversely extended tread sections 6, the tread sections being connected to the supporting sections 5 at the ends of the tread sections in any well known manner.

The ends of the supporting sections are connected by means of the connecting links 7 and 8 which are of constructions to permit them to be readily and easily connected or disconnected at the will of the operator.

Figure 3:
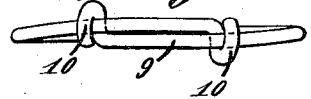
Figure 3 is an elevational view disclosing the construction of the connecting ring.
Figure 4:
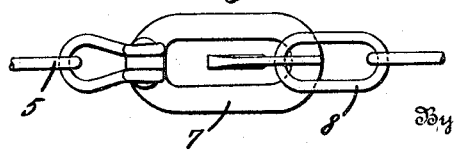
Figure 4 is a plan view of the connecting means at the ends of the chain.

A securing ring indicated at 9 embodies a length of flexible metal having its ends formed into loops 10 looped around the opposed portion of the body of the ring as clearly shown by Figure 3 of the drawing so that the ring will be capable of expansion and contraction to assist in tightening the chain on a vehicle wheel.

Resilient connecting members connect the outer supporting chain section with the securing ring 9 each of which resilient connecting members includes a rod 11 having an opening 12 formed in one end thereof, to afford means of connection between the rods and chain section. A head 13 is formed on the inner end of the rod 11 and provides an abutment for one end of the coiled spring 14 the opposite end thereof resting against the end wall 15 of the barrel 16 of the resilient connection.

Thus it will be seen that the coiled spring 14 will normally act to urge the head 13 towards the inner end of the barrel 16 whereby movement of the head 13 in the opposite direction will act against the coiled spring to restrict movement of the head 13.

Closing the inner end of each tubular member is a cap 17 which is secured to the tubular member by means of the securing pin 18. This cap supports a clasp 19 which is of the usual spring type and designed to be readily positioned over the supporting ring 9 to secure the resilient connecting members to the supporting ring 9.

Thus it will be seen that the resilient connecting member will act to tighten the antiskid chain on the wheel at all times.

From the foregoing it will be obvious that due to this construction, the inner supporting chain section may be readily and easily positioned over a tire and the resilient connecting members positioned over the supporting ring 9 to secure the chain in position.

When the resilient connecting members have been positioned the connecting links 7 and 8 are moved to positions to connect the adjacent ends of the supporting chain sections to the end that the anti-skid chain will be securely held to the wheel against accidental displacement.

We claim:

An anti-skid chain securing device including a split resilient securing ring having eyes formed at its ends, the eyes adapted to accommodate portions of the ring adjacent to the ends thereof, and resilient members having connection with the ring to secure a chain thereto.

In testimony that we claim the foregoing as our own, we have hereto affixed our signatures.

FRANCIS J. DESSERY.
WILLIAM NIEBAUM.